United States Patent [19]
Moon

[11] Patent Number: 5,487,236
[45] Date of Patent: Jan. 30, 1996

[54] PLANT FOOD AND FERTILIZER APPLICATOR

[76] Inventor: Donald D. Moon, 40 Worcester Ave., Springfield, Mass. 01107

[21] Appl. No.: 394,503

[22] Filed: Feb. 27, 1995

[51] Int. Cl.⁶ .................................................. A01G 29/00
[52] U.S. Cl. ........................................................ 47/48.5
[58] Field of Search ................................. 47/48.5, 48.5 R

[56] References Cited

U.S. PATENT DOCUMENTS

| | | | |
|---|---|---|---|
| 2,687,598 | 8/1954 | Calhoun | 47/48.5 X |
| 2,857,864 | 10/1958 | Cromer | 47/48.5 X |
| 3,290,821 | 12/1966 | Parry | 47/48.5 X |
| 3,903,815 | 9/1975 | Winkler | 47/48.5 X |
| 4,934,288 | 6/1990 | Kusiak et al. | 47/48.5 X |
| 5,105,578 | 4/1992 | Fleuridas et al. | 47/48.5 |
| 5,343,654 | 9/1994 | Paquin et al. | 47/48.5 |

FOREIGN PATENT DOCUMENTS 1004854  2/1977  Canada ................................. 47/48.5 R Primary Examiner—Ramon S. Britts
Assistant Examiner—Joanne C. Downs
Attorney, Agent, or Firm—Ross, Ross & Flavin

[57] ABSTRACT

This is a hand operated fertilizing tool by means of which, upon ground penetration of a tine, the apparatus may be swung in a side-to-side and back-to-front motion so as to enlarge the void created by the tine, into which enlarged void the fertilizing substance, whatever it may be, is gravity fed downwardly through a dispensing tube and directly into the enlarged void, the fertilizing substance being blocked from passage through the dispensing tube until a laterally shiftable blocking means intercepting through the dispensing tube is slid from a no go to a go position.

2 Claims, 1 Drawing Sheet

PLANT FOOD AND FERTILIZER APPLICATOR

BACKGROUND OF THE INVENTION

1. Field of the Invention

The invention teaches a hand-operated tool for applying a plant food or fertilizer to the soil, and more, in particular, it teaches an apparatus for displacing the soil in a flower or vegetable garden and replacing it with a fertilizer or plant food.

2. Description of the Prior Art

Examples of devices for applying a plant food or fertilizer into the soil which I have uncovered in the course of searching for anticipations include the following:

U.S. Pat. No. 2,857,864 to Cromer describes a device where fertilizer is removed from a hopper and driven into the ground through a gear-driven system.

U.S. Pat. No. 2,902,953 to Young teaches a use of tap water to operate a jet siphon.

U.S. Pat. No. 3,290,821 illustrates use of a stick-type fertilizer which is slip-fit over a spike which is driven into the ground.

U.S. Pat. No. 3,821,863 to Chan teaches a tapered container which is driven into the ground, the container being divided into compartments, each containing plant nutrients. Control is practiced by means of a sleeve circumscribing one of the compartments. The other compartment contains bars of iron as a source of iron rust for the plant life.

U.S. Pat. No. 3,900,962 to Chan discloses a wind driven collector for conveying air and rainwater in combination with fertilizer to the plant roots.

U.S. Pat. No. 3,903,815 to Winkler is a device for forcing bullet-shaped pellets of fertilizer into the ground.

Obviously, it is known to supplement soil with plant food or fertilizer for stimulating plant growth.

Known is the practice of distributing the fertilizer by hand around the plants and on the soil surface. Of course this is an inefficient method; the fertilizer can be easily washed or blown away.

Another method is to use a tool to apply the fertilizer or plant food into the soil, such as exemplified by the above cited art.

SUMMARY OF THE INVENTION

The present invention is a hand operated fertilizer applicating tool useful in introducing fertilizer or other plant food into the soil surrounding the roots of the plants.

BRIEF DESCRIPTION OF THE DRAWINGS

Referring to FIGS. 1 and 2, the apparatus will be seen to include a lateral, manually-engageable handle 10, a pair of spaced oppositely-facing vertically-disposed support rods 12, a vertical hollow dispensing tube 14 disposed between the lower portions of support rods 12 of the pair thereof, a vertical ground-penetrating spike 16 fixed to the lower portion of dispensing tube 14, and a laterally-extending pedal 18 for applying pressure to ground-penetrating spike 16 when it is desired to drive same into the ground for the purpose of creating a hole into which the fertilizer or plant material will be dispensed by virtue of the gravity fall.

Figure 1:
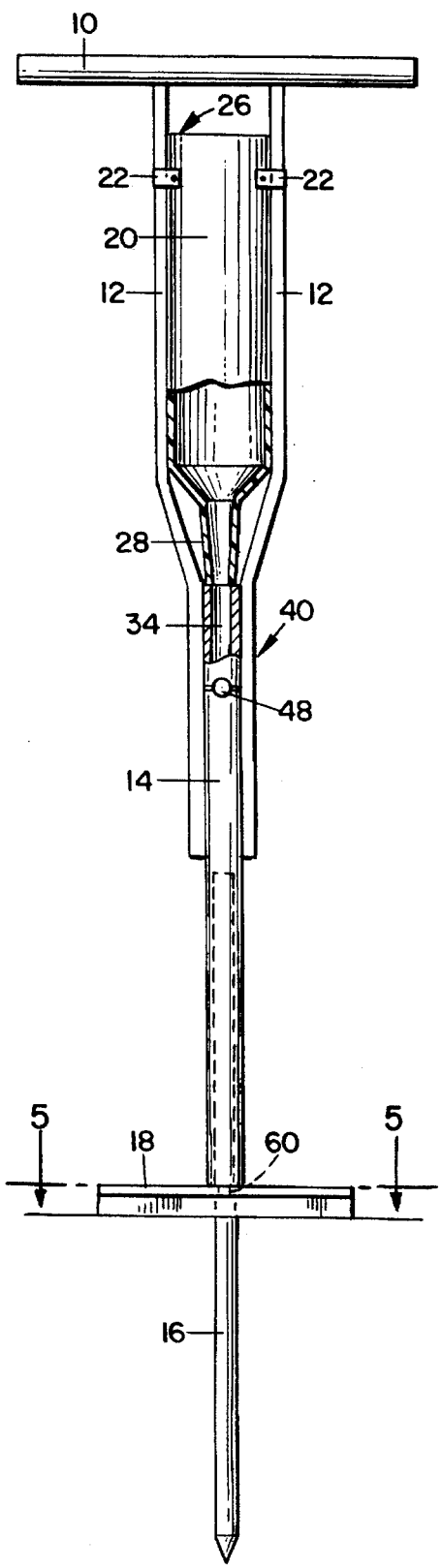
FIG. 1 is a view in front elevation of the device of the invention with certain parts broken away for the sake of clarity.
Figure 2:
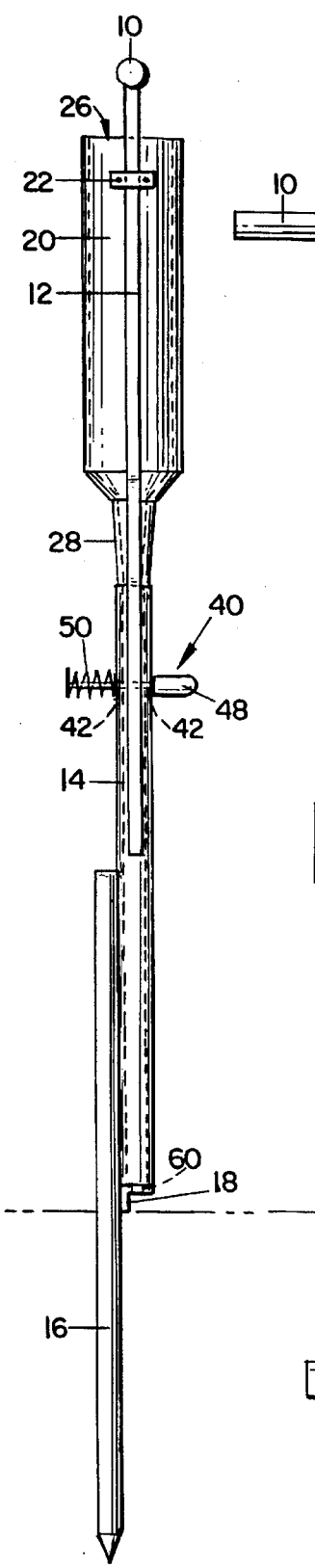
FIG. 2 is a view in side elevation of the FIG. 1 apparatus.
Figure 3:
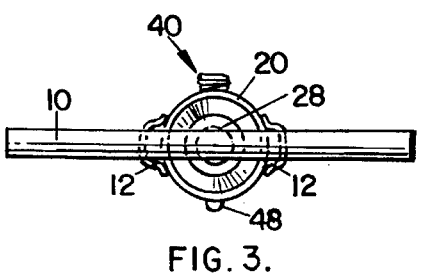
FIG. 3 is a view in top plan of the FIG. 1 apparatus.
Figure 4:
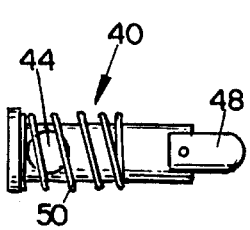
FIG. 4 is a view in top plan of the spring loaded slide of the invention.
Figure 5:
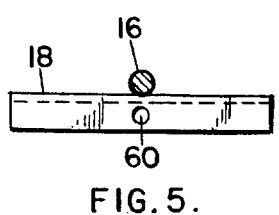
FIG. 5 is a sectional view on the line 5—5 of FIG. 1.

Within the spacing between the upper portions of support rods 12 a plastic container 20 of cylindrical or other configuration is disposed, being held relative to the support rods by means of riveted strips of sheet metal 22.

The container is open-ended at its upper extremity 26 and is funnel-shaped in its lower portion 28 so as to define dispensing tube 14, said dispensing tube being open at both its upper receiving end 32 and at its lower discharging end 34.

A lateral slide 40 is slidably extendable through oppositely disposed openings 42 in dispensing tube 14 and is itself provided with a through opening 44 which may be selectively positioned by the sliding of the slide horizontally between a through passage go-position communicating with the interior of the dispensing bar and a blocking no-go position denying communication with the hollow tube interior.

Slide 40 may be shifted horizontally between go and no-go position by means of a manually engageable portion 48, such movement being facilitated by means of a compression spring 50 circumscribing the slide at its opposite end and exteriorly of the dispensing tube.

Operationally, the fertilizer or plant feed is charged into plastic container 20, care being taken to ensure that slide 40 is in its no-go or blocking position to ensure against the gravity flow of the feed downwardly past the slide and outwardly of the dispensing tube.

The apparatus is then brought to the insertion site where the spike is inserted into the ground by means of the user's foot pressure on pedal 18.

With ground insertion to the desired depth having been completed, the user will then force the apparatus in a back-and-forth hole-widening motion so as to define a cavity adjacent the spike and, of course, with the developed void in the ground being made of a desired dimension widthwise and depthwise, the slide is then manually moved into the go position, allowing the fertilizer or plant food to gravity fall through the balance of the dispensing tube length and outwardly thereof and into the void.

I claim:

1. Soil conditioning apparatus comprising:

a vertically disposed main body, a manually engageable handle secured to an upper portion of the main body, a fertilizer receiving chamber secured to the main body and having upper and lower open ends, an open-ended hollow dispensing tube fixed to the main body below and in communication with the fertilizer receiving chamber, an apertured lateral slide having an intercepting relationship with the tube interior and being shiftable between a communicating position with the slide aperture being aligned with the tube interior and a non-communicating position with the aperture of the slide being in non-alignment with the hollow of the hollow tube, ground penetrating tine secured to and in vertical alignment with the main body for easy insertion into the ground, and a lateral pedal fixed to the main body facilitating the penetration of the tine upon the exertion of foot pressure on the pedal.

2. Fertilizing apparatus comprising:

a vertically-disposed main body, a handle secured to the main body, a vertically-disposed fertilizer-receiving chamber secured to the main body and having upper and lower open ends, an open-ended dispensing tube fixed to the main body below and in communication with the fertilizer-receiving chamber, a lateral slide having an intercepting relationship with the dispensing tube and being shiftable between communicating position with an aperture in the slide being coaxial with the tube interior and a non-communicating position with the aperture of the slide being in non-alignment with the tube interior, a ground-penetrating tine secured to and in vertical alignment with the main body, and a lateral pedal fixed to the main body for facilitating ground penetration of the tine upon the exertion of foot pressure thereupon, all arranged whereby fertilizer charged into the fertilizer-receiving chamber is gravity-fed to the dispensing tube where it is retained by the non-communicating position of the slide and is discharged by gravity feed with the slide in the communicating position into an opening in the ground as defined by the tine.

* * * * *